United States Patent
Beardsley

(10) Patent No.: US 6,917,702 B2
(45) Date of Patent: Jul. 12, 2005

(54) CALIBRATION OF MULTIPLE CAMERAS FOR A TURNTABLE-BASED 3D SCANNER

(75) Inventor: Paul Beardsley, Cambridge, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 617 days.

(21) Appl. No.: 10/128,827

(22) Filed: Apr. 24, 2002

(65) Prior Publication Data

US 2003/0202691 A1 Oct. 30, 2003

(51) Int. Cl.⁷ .............................................. G06K 9/00
(52) U.S. Cl. ...................................... 382/154; 345/419
(58) Field of Search ............................... 382/154, 100, 382/107; 345/419, 420, 427, 418; 353/69, 70

(56) References Cited

U.S. PATENT DOCUMENTS

| | | | | |
|---|---|---|---|---|
| 6,563,499 B1 | * | 5/2003 | Waupotitsch et al. | 345/420 |
| 2002/0050988 A1 | * | 5/2002 | Petrov et al. | 345/418 |
| 2003/0044048 A1 | * | 3/2003 | Zhang et al. | 382/107 |

OTHER PUBLICATIONS

Szeliski, "Shape from rotation," Proc. Conf. Computer Vision and Pattern Recognition, 1990.

* cited by examiner

*Primary Examiner*—Vikkram Bali
(74) *Attorney, Agent, or Firm*—Dirk Brinkman; Andrew J. Curtin

(57) ABSTRACT

In a method and system for calibrating a multiple cameras, a calibration object is placed on a turntable while a set of images is acquired with each camera while rotating the turntable. Vertices of a calibration pattern are located in each set of images, and intrinsic parameters for each camera are determined from the vertices. An orientation of a rotation axis of the turntable relative to a position of each camera is estimated from the intrinsic parameters of each camera. A dependency of each orientation on a global geometry of the calibration pattern is minimized. Then, one camera is selected as a fixed camera, all other cameras are designated as floating cameras. A translation vector between the fixed camera and each floating camera is determined, and the translation vectors are used to place the cameras in a common coordinate frame according to the translating vectors.

7 Claims, 3 Drawing Sheets

CALIBRATION OF MULTIPLE CAMERAS FOR A TURNTABLE-BASED 3D SCANNER

FIELD OF THE INVENTION

This invention relates generally to calibrating scanners, and more particularly to calibrating multiple cameras for a turntable-based 3D scanner system.

BACKGROUND OF THE INVENTION

Many computer graphics systems require realistic three-dimensional models to render arbitrary, realistic but synthetic scenes. The models can be used for animation, solid modeling, visualization, robotics, games, scientific studies, CAD/CAM, and multimedia. In computer graphics systems, three-dimensional rendering software and graphics luminance models typically display three-dimensional models.

Due to many limitations and incomplete information about the physical objects to be modeled, it is very difficult to derive complete mathematical models and supply all necessary camera parameters. Generating high complexity models is therefore tedious and extremely time-consuming.

Systems which use laser scanning and range sensing hardware to generate 3D information from an object are very expensive and therefore inaccessible to most people. In addition, the complex hardware is difficult to repair or replace. Laser scanner methods and systems are also intrusive. The color map from laser systems is also restricted by the wave-length of the laser light and therefore lacks realism.

Other methods acquire images of the object from a discrete number of vantage points. The images are stitched together to form a panoramic screen of the object. However, because no model is ever generated, one cannot place the object in an arbitrary scene, and the object can be viewed only from the vantage points at which the images where acquired.

Many systems use geometrical camera calibration to determine a set of camera parameters. The camera parameters describe the mapping between the three-dimensional coordinates of the object and the two-dimensional image coordinates. The numerous calibration techniques known are typically divided into two groups, namely, one-time, high-accuracy parameter calculation methods, and task-oriented, coarse, inexact calibration methods.

The high accuracy methods rely on an accurate determination of image features, and typically use specific assumptions about the environment or camera parameters to achieve better accuracy. These computationally expensive calibration techniques are usually performed only once, as a preprocessing step of a model acquisition process.

One accurate calibration technique is described by Tsai in "A Versatile Camera Calibration Technique for High-Accuracy 3D Machine Vision Metrology Using Off-the-Shelf TV Cameras and Lenses," IEEE Journal of Robotics and Automation. Vol. RA-3, No. 4, 1987. Tsai's camera model is based on a pin-hole model of 3D-2D perspective projection with first order radial lens distortion. His technique accounts for camera pose in a world coordinate system with 3D rotation and translation, scaling, focal length, and aspect ratio.

Coarse calibration techniques are typically used in complex, interactive environments. As an advantage, coarse calibration can provide continuous calibration updates, simplicity, quick computation, and adaptation to changing camera and world conditions.

In applications where the three-dimensional position and orientation of the camera images relative to the object are arbitrary, the object is sometimes imaged against a calibration pattern in the background. Typically, the pattern includes a number of horizontal and vertical grid lines having known spacing. Other patterns can include dots or other markers, again arranged in a known rectilinear relationship. There are a number of problems with such systems.

To acquire accurate models of real world objects, turntables can be used. Here, the object is placed on a rotating turntable, and the object is imaged from various directions, see U.S. patent application Ser. No. 09/842,972 "Image-Based 3D Digitizer," filed by Pfister et al., on Apr. 26, 2001. Single-camera turntable-based scanners have a long history, see Szeliski, "Shape from rotation," Proc. Conf. Computer Vision and Pattern Recognition, 1990. However, turntable-based systems that use multiple scanners have received little attention, and the task of calibrating such systems is difficult.

Therefore, it is desired to provide a calibration technique for calibrating multiple cameras for modeling systems where objects are placed on turntables for 3D model acquisition.

SUMMARY OF THE INVENTION

In a method and system for calibrating a multiple cameras, a calibration object is placed on a turntable while a set of images is acquired with each camera while rotating the turntable.

Vertices on each visible plane of the calibration object are located in each set of images, and intrinsic parameters for each camera are determined using the vertices. Then, one camera is selected as a fixed camera, all other cameras are designated as floating cameras. The position and orientation of the fixed camera, i.e., the camera's extrinsic parameters, relative to the rotation axis of the turntable are estimated using the vertices and the intrinsic parameters.

A translation vector between the fixed camera and each floating camera is determined, and the translation vectors are used to place all the cameras in a common coordinate frame according to the translating vectors.

A dependency of the results on the global 3D geometry of the calibration object is avoided, because it is inconvenient to construct calibration objects with accurately known 3D vertices on each plane.

DETAILED DESCRIPTION OF THE PREFERRED EMBODIMENT

The invention provides a system and method for calibrating multiple cameras used with a turntable-based 3D scanner. The invention obtains accurate camera positions relative to a rotation axis of the turntable. Hence, camera positions relative to the turntable can be generated for any specified degree of rotation. Given these camera positions, and corresponding images of a physical object on the turntable, it is possible to acquire a 3D model of that object.

The present invention deals with the calibration process, i.e., a full metric calibration, obtaining the intrinsic and extrinsic parameters of the multiple cameras, and an axis of rotation of the turntable in an Euclidean coordinate frame. After, the system has been calibrated, models of objects can be constructed by the scanner.

System Structure

Figure 1:
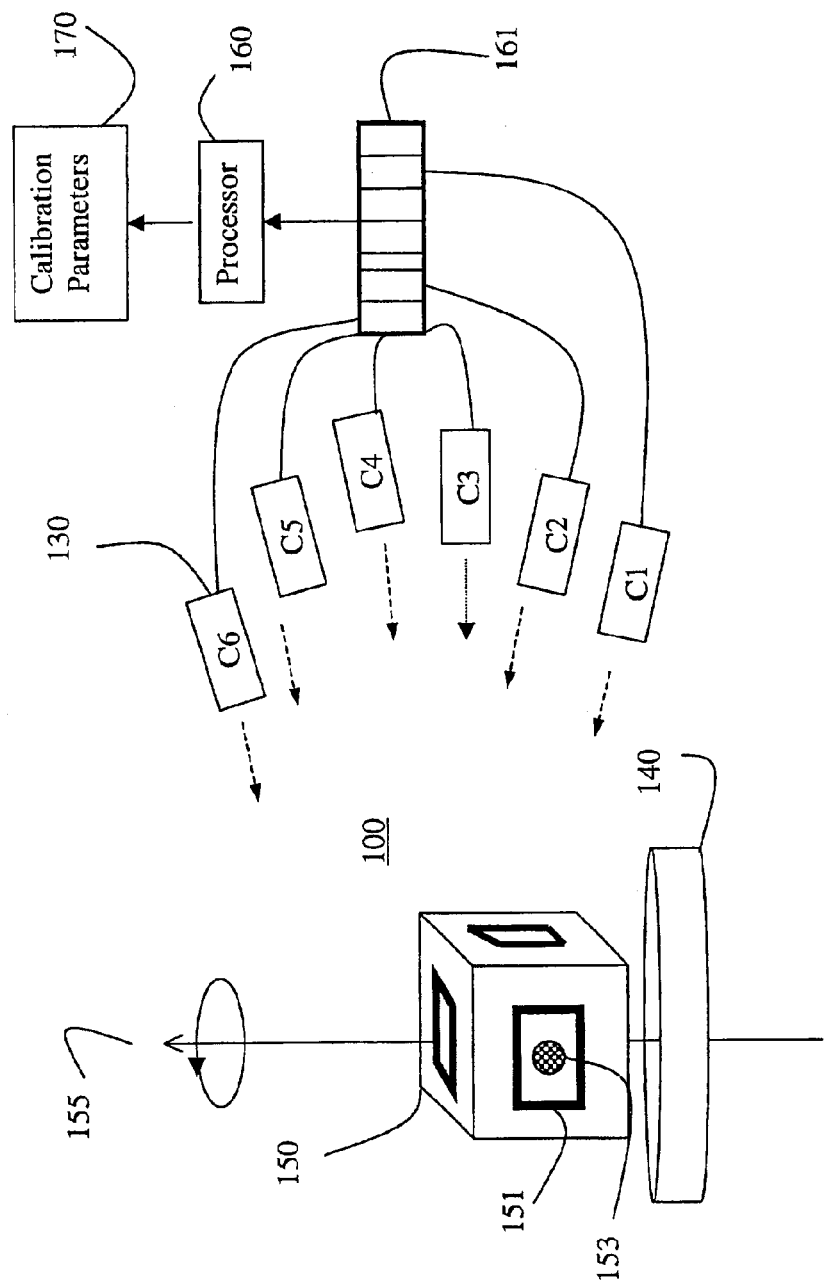
FIG. 1 is a schematic of a calibration system according to the invention.

FIG. 1 shows a system 100 for calibration of multiple cameras according to the invention. The system 100 includes multiple cameras (C1–C6) 130, and a turntable 140. A processor 160 receives sets of calibration images 161 acquired by the cameras 130 determine calibration parameters 170 of the system 100.

Six QImaging QICAM cameras with 1360×1036 pixel color CCD imaging sensors are used. The cameras are capable of acquiring full resolution RGB images at 11 frames per second. The cameras are photometrically calibrated as described in greater detail below. They are connected via FireWire to the processor 160, a 700 MHz Pentium III PC with 512 MB of RAM. The cameras 130 are spaced equally along elevation angles of a hemisphere generally directed at the turntable.

System Operation

Figure 2:
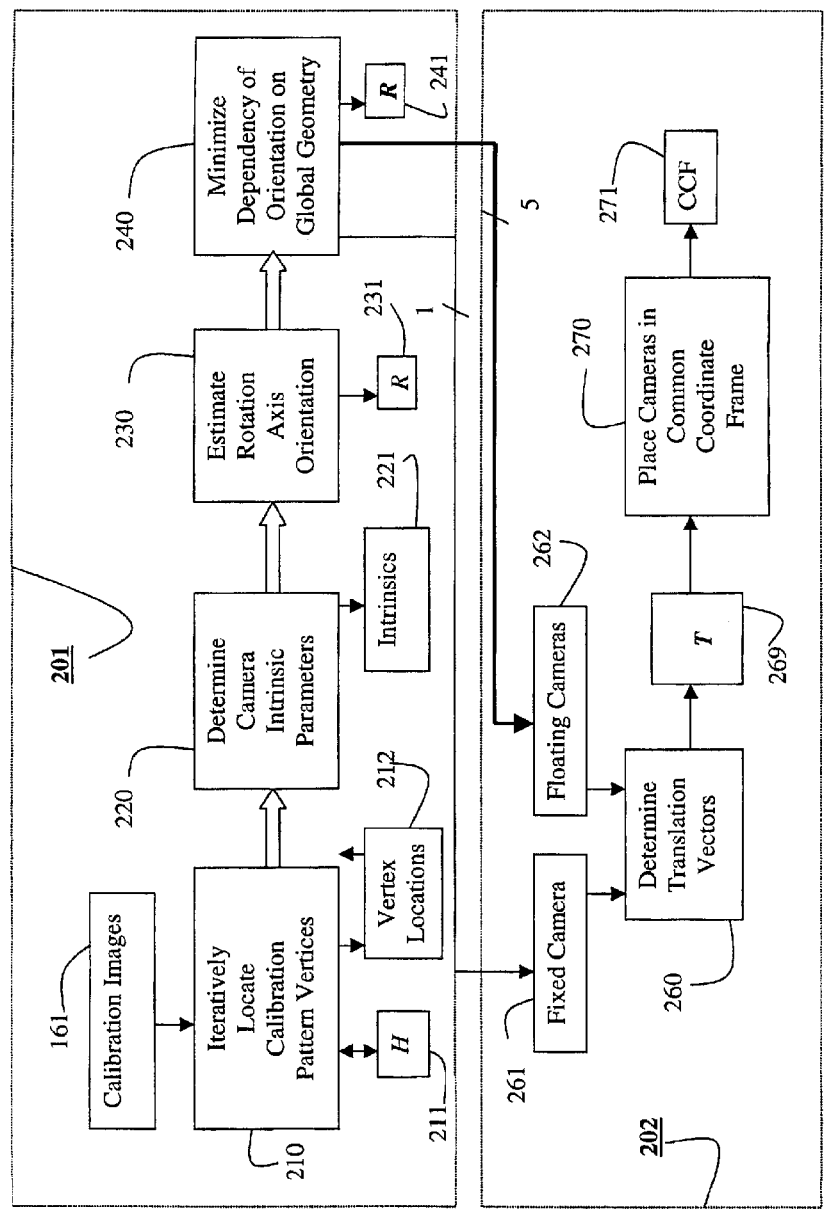
FIG. 2 is a flow diagram of a calibration method according to the invention.

The operation of the system is shown in FIG. 2.

Acquiring Calibration Images

The calibration method starts by placing a known calibration object 150 on the turntable 140 and, if necessary, adjusting the position, focus, and aperture of each camera 130. The set of calibration images 161 of the calibration object, e.g., a cube with a known pattern are then acquired 210 by the scanners 130, e.g., cameras 130. This provides an extensive set of views of the calibration object from a variety of viewpoints. Typically, the rotation is through 36 positions at ten degree intervals, giving a total of 6×36=216 images. The rotation axis 155 of the system 100 is fixed. The intrinsic and extrinsic camera parameters and axis of rotation, i.e., calibration parameters 170, can then be determined.

Degrees-of-Freedom

There are 51 degrees-of-freedom (DOF) in the system 100, which break down in the following way. There are three DOF for the intrinsic parameters of each camera 130, i.e., focal length and principal point. The extrinsics for one of the cameras can be described by three DOF, i.e., orientation relative to the rotation axis 155, because the 3D coordinate frame only needs to be obtained up to an arbitrary origin and scale. There are then six DOF, i.e., rotation and translation, for the extrinsics of each of the five remaining cameras. When high-quality lenses are used, radial distortion can be ignored.

In the preferred embodiment, the intrinsic parameters of each camera are determined first. Then, the orientation of each camera 130 relative to the rotation axis 155 is determined independently. This is referred to as single-camera calibration 201. Finally, all the cameras are placed in a common coordinate frame (CCF) 271. This is referred to as multi-camera calibration 202. With this information, the position of each camera 130 relative to the turntable 140 for any desired degree of the rotation can be determined. Typically, a set of 36 images 161 are acquired by each camera, as described above, giving a total of 216 images. Of course, it is also possible to derive camera positions for arbitrary values and irregular increments of the rotation, if so required.

The calibration method utilizes sets of sequences of images 161 of the calibration object 150. The purpose of the calibration object is to determine very accurate point positions in the images. However, its use does raise practical issues. It is easy to generate patterns like the ones shown in FIG. 1 on the different faces of the object, and to know the local geometry of those individual patterns on each face.

However, it is difficult, without special manufacturing, to place the patterns on the different faces of the object in an accurately known relative position. The calibration process according to the invention takes this into account. The processing assumes that the local geometry of the individual patterns on each face is accurately known. In the beginning steps of the processing, it is also assumed that the global geometry of the entire calibration object 150 is known. However, in the final steps, dependence on this global geometry is removed so that the process is immune to any inaccuracy in placing the patterns relative to each other on the faces of the object.

Processing the Calibration Pattern

This section describes how the vertices for a pattern like those on the individual faces of the calibration object 150 in FIG. 1 are located 210. Each pattern has a black rectangular bar 151 on a white background, and there are eight calibration vertices, i.e., four corner vertices on an outer boundary of the rectangular bar, and four corner vertices on an inner boundary of the bar. The center of the pattern can include a distinctive colored marker 153, with a unique color coding for each face of the calibration object to identify each of the faces.

First, the well-known canny edge detection process is run on each image. Auto-detection of the colored markers 153 is used to provide initial guidance for the image position of the pattern, in the form of a planar point-point homography H 211. The homography H maps the pattern from its canonical coordinate frame to the image coordinate frame. The initial estimate of H is obtained as described below. The homography H can be used to generate an estimate of the image position of the eight line segments of the pattern, i.e., the four external and four internal line segments for the black bar. For each estimated line segment, nearby edges with appropriate orientation are identified, and a straight line is fitted to the sub-pixel edge positions using orthogonal regression. The line segments intersect at the vertices.

The fitted lines are then used to determine a new estimate of the homography H 211. A planar point-point homography H is related to a line-line homography H' for the same plane by $H'=H^T$, so that point or line homographies can be used interchangeably as required.

The process of edge collection and the determination of the homography H are iterated. At each iteration, the agreement between the mapped canonical calibration pattern and the edge map is determined. Iteration terminates when this measurement shows no further improvement. The vertices of the canonical calibration pattern are mapped to the image frame using the final estimate of H, to provide a final estimate of the image locations 212 for the calibration vertices.

Single-Camera Calibration

The single-camera calibration 201 is carried out separately for each of the six cameras.

The object is to determine an orientation of each camera relative to the rotation axis 155 of the turntable 140. There are four steps, locating 210 the vertices of the calibration pattern in the sets of 36-image sequences acquired by each camera, determining 220 the intrinsic parameters for each the camera, estimating 230 a position of each camera for each of the 36 images, in order to provide an initial estimate R 231 of the orientation of the camera relative to the rotation axis 155, and a minimization 240 to obtain the best estimate of orientation of the camera relative to the rotation axis 250.

Locating Calibration Vertices

The calibration object 150, as shown in FIG. 1, has patterns of similar appearance on its visible faces, so to achieve automatic tracking the patterns are supplemented with the distinctive colored markers 153, one unique marker for each face of the object.

To initialize tracking of the object 150 through the sequence of images 161, the first two images are processed and the colored markers detected. The detected markers provide an initial estimate for the homography H 211 of each plane, thus, "seeding" an accurate determination of the vertex locations 212 on the calibration object 150.

A 3×4 perspective projection matrix P is then constructed, using the known 3D local geometry of the calibration patterns 151 on the calibration object 150 and the corresponding image vertices. This matrix P is decomposed into its Euclidean form. In addition, a fundamental matrix is constructed for the relationship between the first two images, and this matrix is decomposed in order to yield the image projection of the rotation axis 155 of the turntable 140. The calibration parameters are then used to locate the 3D coordinates for the rotation axis.

For the remaining images, the calibration patterns can be determined similarly via detection of the colored markers 153. For maximum reliability, this approach can be supplemented with the information as computed in the previous paragraph. By using one of the two calibrated cameras and the rotation axis, it is possible to estimate the camera position relative to the object 150 for each of the 36 positions in the image sequence. Each estimated camera determines what faces of the calibration object are visible, plus an initial estimate of the homography 211 for the individual calibration patterns. This provides all the information needed to seed the accurate locations 212 of the calibration vertices, and the calibration vertices for the entire image sequence can be obtained automatically.

Determining Intrinsic Parameters

At the completion of the previous step, the homographies for multiple calibration planes at a variety of orientations relative to the camera are available and the intrinsic parameters 212, i.e., the focal length and principal point, of each camera can be determined 220 as described by Zhang, "A flexible new technique for camera calibration," IEEE Pattern Analysis and Machine Intelligence, 22:1330–1334, 1999. As stated above, radial distortion is assumed negligible and is not measured.

Estimating Rotation Axis Orientation

After the intrinsic parameters are available, certain images of the sequence are selected using a visibility test. The selected images have two or more calibration patterns visible. The visibility test accepts calibration planes for which the angle between the camera view direction and the plane normal is less to that direction is less than 60 degrees. Using this criteria, about 16 images are typically utilized for the physically lower cameras, while all images are selected for the higher cameras where the pattern on the top face of the object 150 and at least pattern on a side face are visible.

The 3×4 perspective projection matrix P is constructed for each such image using the known local geometry of the calibration object and the corresponding image points. Then, enforcing the values for the intrinsic parameters 212, the matrix P is decomposed to estimate of rotation and translation of the camera.

The information from the individual cameras is now integrated to obtain an estimate R 231 the rotation axis 155 of that camera relative to the rotation axis. The orientation of the rotation axis is estimated 230 by fitting a plane to the focal points of the estimated cameras and taking its normal. A point on the rotation axis is obtained by taking all pairs of cameras which are diametrically opposed in the image sequence, constructing a line connecting the two focal points, and then finding a best-fit intersection point of all such lines.

Minimizing Dependency of Orientation of Rotation Axis on Global Geometry

At this point, the initial estimate R 231 of the orientation of the rotation axis of the turntable has been estimated. However, as stated above, the calibration process depends on an accurate knowledge of the global geometry of the calibration object. This dependency on the global geometry of the calibration object 150 is now removed in a minimization process 240 that determines a new estimate R 241 of the rotation axis.

The minimization 240 is over three parameters for the rotation axis, characterized for this purpose by its projection on the image plane, i.e., the vanishing point of the rotation axis on the image plane (two parameters), and the direction of the image line through this point (one parameter). At each step of the minimization, given the intrinsics 221 plus the current estimate 231 of the rotation axis, the full set of 36 camera positions for the image sequence is determined.

Using the images of these cameras, each point that is visible in a pair of images is used to generate an epipolar error. The full set of residuals is collected, and the $90^{th}$-percentile provides the cost function for the minimization.

Multi-Camera Calibration

The result of the processing so far is an independent estimate of the orientation of each camera 130 relative to the rotation axis 155. In each case, the origin and scale of the coordinate frames of each camera remains undefined. The object now is to place 270 all the cameras in a common coordinate frame (CCF) 271.

One of the central cameras, e.g., C3 or C4, is taken as fixed i.e., it defines the common coordinate frame, and will be referred to as the 'fixed camera' 261. The five remaining cameras are each referred to as a 'floating camera' 262, and each floating camera is processed independently as follows.

The orientation of each floating camera 262 relative to the rotation axis 155 is already known, and the relationship is assumed to be fixed for now. The object is to determine 260 a translation vector T 269 between the fixed camera 261 and each floating camera 262.

A set of all matched points between image j of the fixed camera and image j+i of the floating camera 262, for all images in the sequence j=0, . . . , 35, is M. This is the set of matched points that have an offset i between the fixed camera image and the floating camera image. Each set $M_i$ can be used to construct a fundamental matrix $F_i$. An epipole in the fixed camera for $F_i$ is $e_i$, and $v_i$ is the a backprojected 3D ray for $e_i$.

Figure 3:
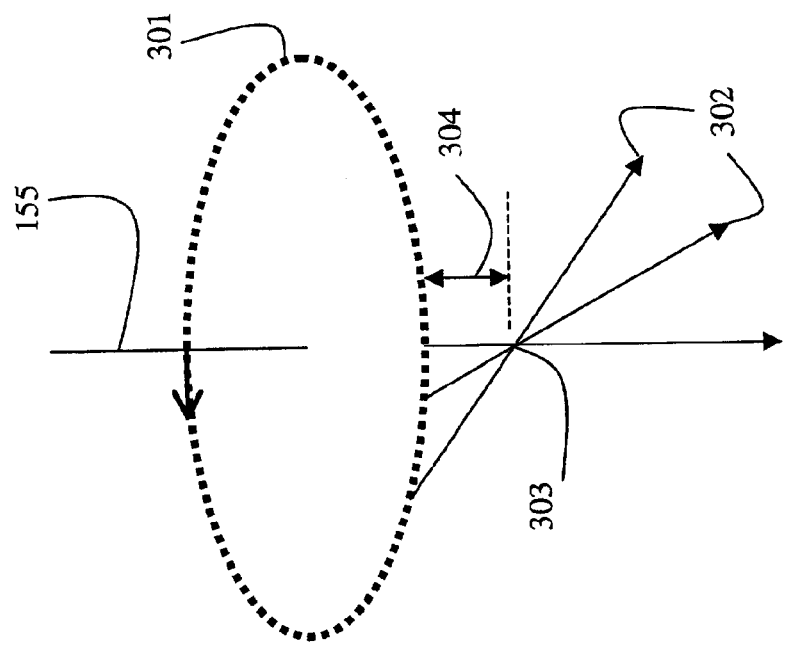
FIG. 3 is a schematic of a process for determining translation vectors according to the invention.

FIG. 3 shows the physical significance of this measurement for the fixed camera sequence 301 around the axis 155. Here, the 3D rays $v_i$ 302 intersect at a point 303 which gives the offset T 304, i.e., the translation vector T 269 between the fixed and each floating camera.

This then provides an initial estimate for a non-linear minimization on the three parameters of T 269. Each point match between a fixed camera image and a floating camera image is used to generate an epipolar error. The full set of residuals is then collected, and the $90^{th}$-percentile provides the cost function for the minimization.

After the error in the translation vector has been minimized, the floating cameras 262 can be placed 270 in the common coordinate frame 271 of the fixed camera 261.

Additional processing can be done to improve the calibration process. As described above, the multi-camera calibration process only determines the translation between the cameras in different sequences, in order to place all cameras in the common coordinate frame. A more thorough approach updates the orientations of the cameras at this stage too. This has the effect of increasing the epipolar geometry error associated with a single camera, but increasing the global error for fall cameras.

Effect of the Invention

Described is a system and method for calibrating a turntable-based 3D scanner. The invention achieves a low error associated with the epipolar geometry of a large number of views. The calibration allows one to acquire accurate 3D models of real world objects with complex geometries using multi-camera scanning techniques. Structures in the order of a couple of pixels in diameter can be recovered successfully in the final model.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for calibrating a plurality of cameras with a calibration object placed on a turntable, comprising:

acquiring a set of images with each camera of the calibration object while rotating the turntable;

locating vertices of a calibration pattern in each set of images;

determining intrinsic parameters for each camera from the vertices;

estimating an orientation of a rotation axis of the turntable relative to a position of each camera from the intrinsic parameters of each camera;

minimizing a dependency of each orientation on a global geometry of the calibration pattern;

selecting one camera as a fixed camera and designating all other cameras as floating cameras;

determining a translation vector between the fixed camera and each floating camera; and placing the cameras in a common coordinate frame according to the translating vectors.

2. The method of claim 1 wherein the calibration object is a cube, and the calibration pattern is a rectangular bar on each face of the cube.

3. The method of claim 1 wherein the locating further comprises:

detecting edges in the calibration pattern; and iteratively fitting line segments to the edges to locate the vertices.

4. The method of claim 3 wherein the line segments are fitted by orthogonal regression.

5. The method of claim 2 wherein each rectangular bar has a different color to automatically track the calibration pattern in the sets of images.

6. The method of claim 1 wherein a plane is fitted to focal points of the intrinsic parameters to estimate the orientation of the rotation axis.

7. A system for calibrating a plurality of cameras with a calibration object, comprising:

a turntable for placing a calibration object;

a plurality of cameras for acquiring a set of images with each camera of the calibration object while rotating the turntable;

means for locating vertices of a calibration pattern in each set of images;

means for determining intrinsic parameters for each camera from the vertices;

means for estimating an orientation of a rotation axis of the turntable relative to a position of each camera from the intrinsic parameters of each camera;

means for minimizing a dependency of each orientation on a global geometry of the calibration pattern;

means for selecting one camera as a fixed camera and designating all other cameras as floating cameras;

means for determining a translation vector between the fixed camera and each floating camera; and means for placing the cameras in a common coordinate frame according to the translating vectors.

* * * * *